United States Patent [19]

Murphy, Jr. et al.

[11] 3,868,855

[45] Mar. 4, 1975

[54] TACHOMETER INSTRUMENT

[75] Inventors: Frank W. Murphy, Jr., Tulsa; Lewis M. Carlton, Jenks; Troy L. Teague, Broken Arrow, all of Okla.

[73] Assignee: Frank W. Murphy Manufacturer, Inc., Tulsa, Okla.

[22] Filed: Jan. 3, 1974

[21] Appl. No.: 430,412

[52] U.S. Cl. .................... 73/530, 73/536, 73/546
[51] Int. Cl. ............................................. G01p 3/18
[58] Field of Search ............ 73/535, 530, 536, 546, 73/550

[56] References Cited
UNITED STATES PATENTS

| | | | |
|---|---|---|---|
| 967,168 | 8/1910 | Bullard | 73/546 X |
| 1,313,175 | 8/1919 | Englesson | 73/550 X |

Primary Examiner—James J. Gill
Attorney, Agent, or Firm—D. Paul Weaver

[57] ABSTRACT

A completely mechanical tachometer features simplicity, few moving parts, and ruggedness, to withstand the heavy vibrations produced by continuous duty stationary diesel engines and the like. The instrument pointer is actuated by a simple mechanical linkage under direct influence of a unique and simplified rotary centrifugal force operated unit. The unit embodies rocker plates and an associated bowed spring and the rocker plates directly activate the pointer driving linkage. The instrument may embody electrical contacts and/or a built-in switch to initiate engine shut-down or an alarm for over-speed or under-speed conditions.

8 Claims, 11 Drawing Figures

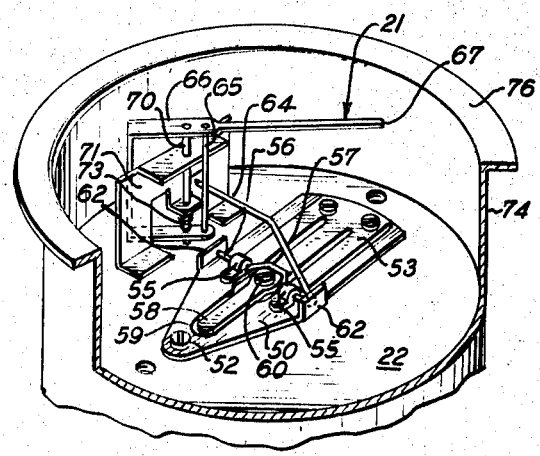
FIG. 1
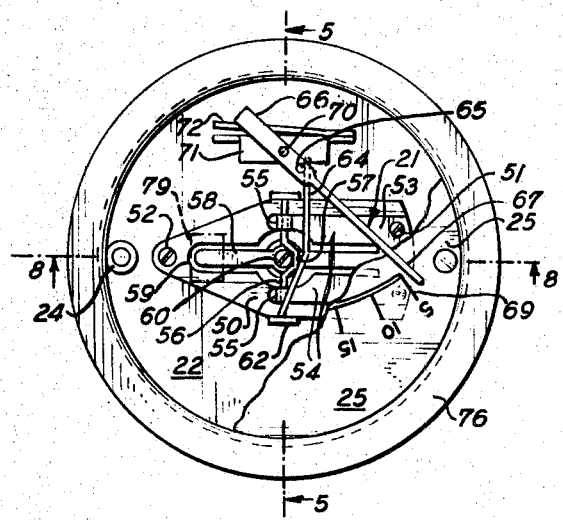
FIG. 2
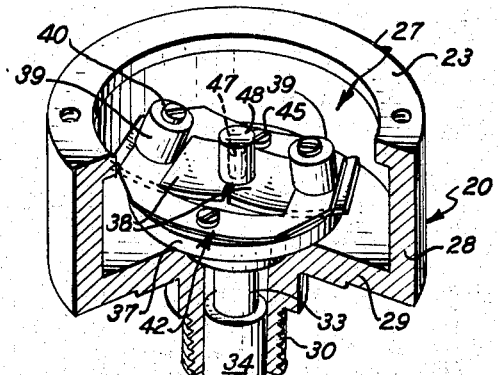
FIG. 3
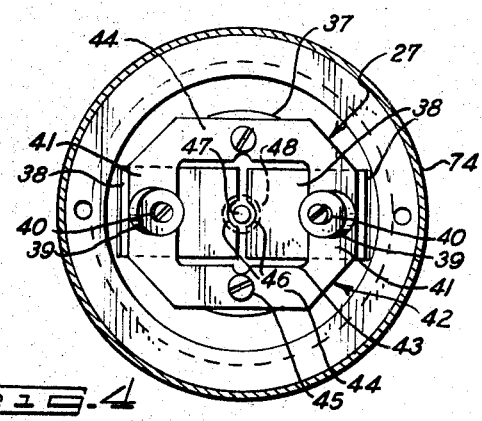
FIG. 4
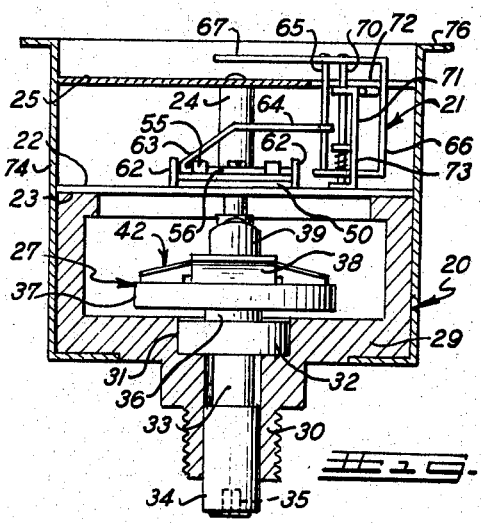
FIG. 5
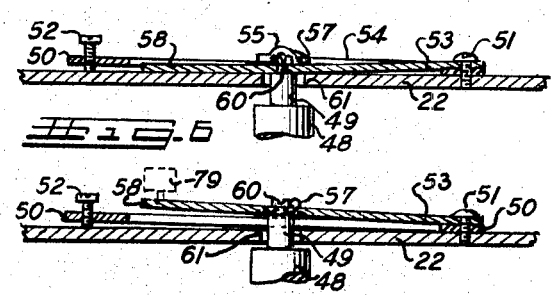
FIG. 6
FIG. 7

TACHOMETER INSTRUMENT

BACKGROUND OF THE INVENTION

A distinct need exists for a reliable low cost tachometer of rugged and durable design to withstand continuous duty on heavy stationary diesel engines and like power units which require monitoring. Available tachometers tend to be delicate and expensive instruments, most of which employ an eddy current or flux drive for the instrument pointer. This is the case with almost all automotive-type tachometers. A few very expensive instruments employ centrifugal fly ball mechanisms to actuate the pointers and these instruments incorporate geared movements which are very delicate and short-lived on heavy continuous duty engines producing much vibration. The before-mentioned automotive type tachometers are even less useful for the intended application because of vibration and shock and due to their inherent delicateness of construction. Some centrifugal fly ball actuated switches to stop engines on over speed are available with reasonably rugged constructions, but these offer no indication of RPM and are difficult to field-adjust.

In view of all of the above, the objective of this invention is the provision of a low cost, completely mechanical tachometer embodying the fewest possible number of rugged parts and minimum movement of parts so as to provide the greatest possible life expectancy for the instrument when used with heavy continuous duty engines. This objective has been fully realized in the invention through the provision of a tachometer which has a simplified rotary centrifugal fly ball mechanism journaled on a sturdy support and adapted to be directly driven by a suitable drive cable from a rotary drive take-off on the engine. Also seated on the same unitary support which mounts the fly ball mechanism is a rugged and simplified instrument pointer and drive mechanism including a crank part which is directly operated from the fly ball mechanism through a simple axial or linear movement transmission element. Associated with this movement which drives the instrument pointer is a unique spring element or tongue adapted to operate a microswitch or the like which may be physically mounted in the instrument casing. The instrument has proven to be highly reliable under the most severe conditions encountered with heavy stationary diesels in the field. Instrument maintenance is minimal and adjustments are few and easy to make.

Other features and advantages of the invention will become apparent during the course of the following description.

BRIEF DESCRIPTION OF DRAWING FIGURES

FIG. 1 is a fragmentary perspective view of a tachometer embodying the invention, partly broken away, and particularly showing the instrument pointer and pointer drive mechanism and associated parts with the pointer in a zeroed position.

FIG. 2 is a plan view of the instrument as depicted in FIG. 1.

FIG. 3 is a fragmentary perspective view, partly in section, showing the centrifugal fly ball actuating mechanism and common support means below the pointer mechanism with the latter removed for clarity.

FIG. 4 is a plan view of the elements shown in FIG. 3.

FIG. 5 is a side elevation of the entire tachometer, partly in section, taken on line 5—5 of FIG. 2.

FIG. 6 is an enlarged fragmentary vertical section through a pointer mechanism support plate and crank arm bearing plate and associated elements.

FIG. 7 is a similar view showing the corresponding parts in a different operative position responsive to engine speed.

DETAILED DESCRIPTION

Figure 8:
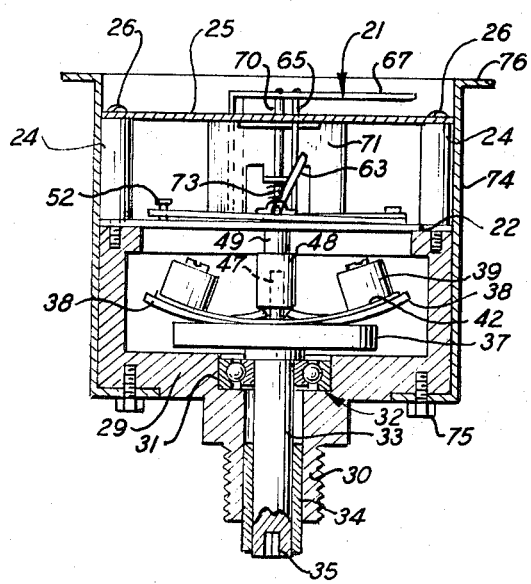
FIG. 8 is an elevational view, partly in section, taken substantially on line 8—8 of FIG. 2.
Figure 9:
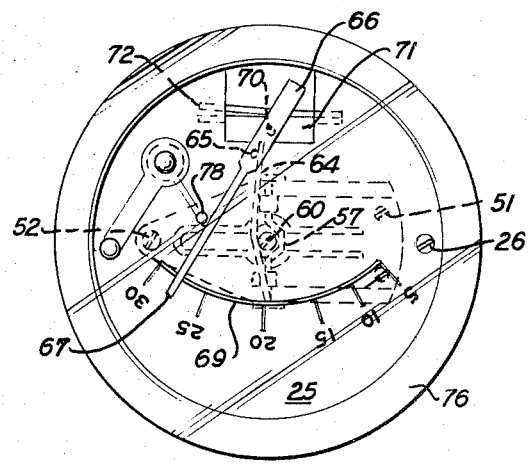
FIG. 9 is a plan view, similar to FIG. 2, showing the instrument pointer and actuating mechanism in an advanced speed indicating position under influence of the fly ball actuating mechanism.

Referring to the drawings in detail wherein like numerals designate like parts throughout, the numeral 20 designates a primary support member or housing part for the two major subassemblies embodiment in the tachometer instrument. These subassemblies are the pointer and pointer drive mechanism designated generally by the numeral 21 and which sub-assembly mechanism is mounted on a relatively rigid support plate 22, firmly seated on the top end face 23 of primary support 20 and secured thereto by a pair of upstanding threaded posts 24, on top of which is mounted the instrument dial or face 25 by means of additional screws 26. The sub-assembly 21 will be described in full detail. The other major sub-assembly supported on the common support member 20 is the rotary centrifugal fly ball device or unit 27 shown in its entirety in FIG. 3. The primary support member 20 for the above two major sub-assemblies of the instrument is made rather heavy and extremely sturdy, preferably as a metal casting. A major feature of the tachometer is its ability to operate reliably and continuously in connection with heavy stationary diesel engines and the like which produce much vibration. Therefore, the very sturdy primary support 20 is a key element whose importance in the invention should be emphasized.

The primary support member 20 includes a preferably cylindrical side wall 28 terminating at its top in the aforementioned end face 23. It further includes a sturdy bottom wall 29 having a central depending screw-threaded sleeve extension 30 for anchoring the instrument in a threaded opening of a suitable support structure. The bottom wall 29 has a central recess 31 formed therein for the reception of a ball bearing 32 within which the rotary shaft 33 of fly ball unit 27 is mounted for low friction rotation. A sleeve bearing 34 within the extension 30 additionally supports and stabilizes the shaft 33 during rotation. The lower end of the shaft 33 has a suitable socket or tang 35 for receiving one end of a tachometer drive cable, not shown, the other end of which is turned by a conventional tachometer drive take-off means on the engine, forming no part of this invention. An enlarged shoulder 36 on the shaft 33 above ball bearing 32 rests on the inner race of the ball bearing and above this shoulder a greatly enlarged disc portion or plate 37 is attached to the shaft 33 suitably or forms an integral part thereof to rotate therewith. The disc portion 37 is spaced slightly above the bottom wall 29. The assembly or unit 27 further includes fly ball means mounted on the disc portion 37 and this means comprises a pair of rigid longitudinally curved rocker plates 38 which rockably engage the flat top face of the disc portion 37. Near their outer ends, the two rocker plates 38 carry equally sized fly ball masses 39 attached thereto by screws 40. These same screws serve to anchor to the rocker plates 38 the outer transverse sections 41 of a bowed thin spring plate 42 formed of stainless steel or the like and having a central generally rectangular opening 43 through which the interior end portions of the rocker plates 38 project. The side longitudinal sections 44 of bowed spring 42 are anchored firmly to the disc or plate 37 by additional screws 45 which screws do not engage the rocker plates 38. The two plates 38 are independently rockable upon the element 37 under influence of centrifugal force and the spring 42 is tensioned to normally hold the outer ends of the rocker plate elevated while their inner ends are relatively depressed toward contact with the disc 37, FIG. 8.

Figure 10:
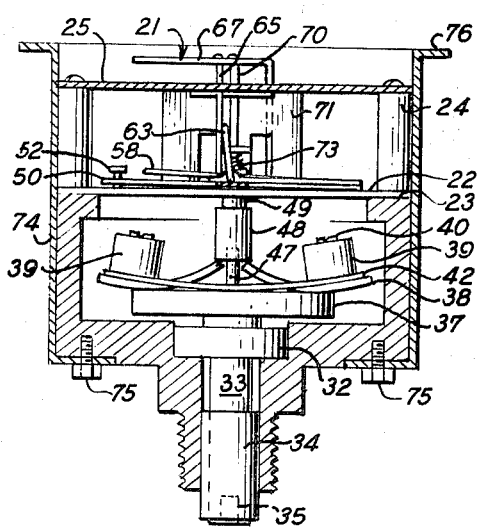
FIG. 10 is a view similar to FIG. 8 with the pointer and actuating mechanism arranged corresponding to FIG. 9.
Figure 11:
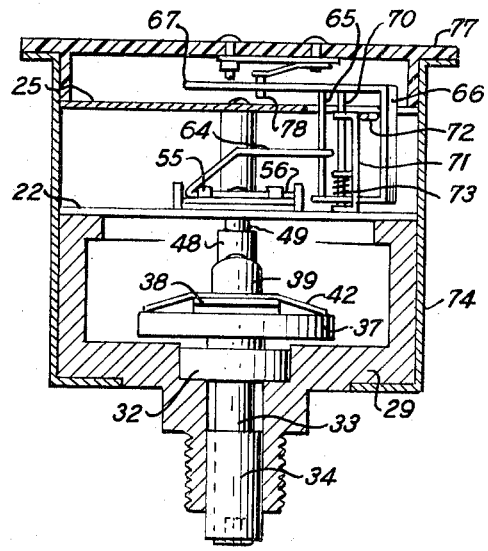
FIG. 11 is a similar view of the instrument taken at right angles to FIG. 10.

When the fly ball device 27 rotates and the masses 39 are influenced by centrifugal force, the bowed spring 42 will tend to flatten out toward the disc 37 and the rocker plates 38 will have their inner ends elevated and their outer ends adjacent to the masses 39 depressed. The inner ends of the plates 38 are notched at 46 in surrounding relationship to a center reduced upstanding pin extension 47 of the shaft 33. The two plates 38 rock and move relative to the extension 47 but do not contact it. Slidably mounted upon the extension 47 is a drive button 48 which is adapted to be elevated axially of shaft 33 by the inner ends of rocker plates 38 which engage beneath the button 48 as clearly shown in FIGS. 8 and 10. As the two plates 38 are rocked in one direction in unison by increasing centrifugal force, the button 48 will shift axially upwardly in response to the movement of the plates which act on the button with a camming action. The top of the button 48 is in direct contact with a movement pin 49 forming a part of the upper pointer sub-assembly 21, previously mentioned.

Referring again to the sub-assembly 21 carried by the support plate 22, this sub-assembly includes a bridging plate 50 on the support plate 22 attached thereto near one end by a pair of screws 51. The other end of the bridging plate 50 carries an adjusting set screw 52 whose lower end bears on the plate 22 but does not have threaded engagement therewith. The adjacent end of the plate 50 may therefore be raised and lowered for adjustment purposes relative to the plate 22 by manipulating the screw 52.

Mounted upon the bridging plate 50 is a crank arm bearing plate 53, preferably formed of beryllium copper or equivalent material. The previously-mentioned screws 51 also serve to anchor the thin plate 53. Separated arms 54 on the plate 53 may have their free ends welded to the underlying plate 50 and the arms are formed near their free ends into bearing knuckles 55 for a pointer driving crank shaft 56 having a single central eccentric 57. This eccentric 57 lies across a center longitudinal tongue 58 of the crank shaft bearing plate 53 so that the crank eccentric 57 is actuated by the rising and falling of the tongue 58 which is resilient. The plate 50 is cut away at 59 beneath the resilient tongue 58 so that the latter may rise and fall. The tongue 58 is attached near its center to the top of movement pin 49 by a small screw 60. The movement pin is shifted axially by the button 48 within a clearance opening 61 of support plate 22.

The crank shaft 56 is held against endwise movement by a pair of upstanding lugs 62 on the plate 50. At one end thereof, the crank shaft 56 carries a vertically swingable arm 63 having a portion 64 parallel to support plate 22 and spaced considerably above the same. In response to turning of the crank shaft 56 by displacement of movement pin 49, the arm portion 64 swings through an arc in one direction and by engagement with a dependent pin 65 on the pivoted yoke 66 of an indicator pointer 67, such pointer is caused to sweep over the dial 25 of the tachometer which is embodied in a plate secured to the tops of posts 24. This dial bears on its upper face an indicator scale 69 suitably graduated in RPMs to coact with the pointer 67 so as to indicate engine speed.

The pointer yoke 66 is pivoted upon a shaft 70 held within a bracket 71 which is suitably fixed to the support plate 22 and extends above the same. This bracket 71 has on its rear side an adjustable stop bar 72 to establish the zero position of the pointer 67 relative to the RPM scale 69. The pointer is biased resiliently to the zero position by a small spring 73, FIG. 8, on the lower part of pointer shaft 70. Thus, when the movement pin 49 rises under influence of the button 48 as initiated by the fly ball mechanism, the swingable arm 64 is moved by the crank shaft 56 to cause turning of the pointer 67 to an increased speed position against the action of spring 73. When the engine speed is reduced, the spring 73 will return the pointer toward the zero position and maintain it in contact with the arm 64. Similarly, the tension of the spring tongue 58 will maintain the movement pin 49 in contact with the button 48 as the latter is shifted axially of the rotary shaft 33. Thus, there is no play or lost motion in the simple mechanical transmission mechanism or train which begins with the rocker plates 38 and ends with the driving of the pointer 67 by the described engagement of the elements 64 and 65.

The instrument is enclosed within a shell or housing 74 attached to the bottom wall 29 of primary support 20 as indicated at 75. This housing encloses the two major sub-assemblies 21 and 27 which are above and below the support plate 22. As explained, all parts are based upon the very sturdy support 20. The top of housing 74 has a flange 76 above the elevation of pointer 67 and a transparent cover or lens 77 is secured to this flange and is formed of plastic or like non-conducting material. The lens 77 carries on its under side a stop pin 78 for the pointer 67 when the latter is in the maximum speed position and this stop pin is adjustable relative to the lens 77 and pointer. As shown in the drawings, it is located in the path of movement of the pointer. The stop pin 78 also has the ability to form an electrical contact to initiate switching for shutting down the engine or activating an alarm indicative of engine over-speed. This electrical capability of the instrument is conventional and need not be described in further detail. In lieu of such an adjustable electrical contact for either the high or low speed position of the pointer or in addition thereto, if desired, a microswitch 79 shown in phantom lines in FIGS. 2 and 7 may be suitably mounted in the upper chamber of housing 74 above plate 22 to be activated by the movement of the spring tongue 58 for controlling a circuit. Thus, the tachometer has the ability to indicate engine speed by purely mechanical means in a reliable manner and additionally has the capability through electrical contacts to shut down the engine in an over-speed situation or activate an electrical alarm or other circuit means. The objectives and features of the invention having been stated it is believed that the structure and operation of the device will now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A tachometer comprising a primary support, a centrifugal fly ball assembly mounted for rotation on said support and adapted for connection with a rotary element of an engine or the like, said fly ball assembly including a rotary plate element having a flat face, a pair of opposed curved rocker plates engaging said flat face rockably, a bowed spring attached to the rotary plate element and also attached to the rocker plates and tensioned to maintain the exterior ends of the rocker plates elevated and their interior ends depressed relative to said flat face, fly ball masses attached to the rocker plates, a reciprocatory drive button in engagement with the interior ends of the rocker plates and adapted to be shifted thereby when said interior ends are elevated in response to an increase in speed of rotation of the fly ball assembly, a support plate attached to said primary support in spaced relation to the rotary fly ball assembly, a pivoted tachometer pointer on said support plate adapted to sweep over a dial having a scale indicating rotational speed, and a drive mechanism for said pointer on said support plate including a crank element, a movement pin for the crank element arranged in engagement with said drive button to be actuated thereby, said support plate having a clearance opening for the movement pin, and a resilient member attached to said movement pin and raised and lowered by displacement of the movement pin and underlying said crank element and contacting the same.

2. The structure of claim 1, wherein said resilient member is an elongated spring tongue having a free end projecting on one side of the movement pin and adapted during displacement by the movement pin to activate an electrical contact means.

3. The structure of claim 1, and said fly ball assembly further comprising a shaft having an axial extension above said flat face, and said drive button consisting of a sleeve element telescopically engaged with said axial extension and guided thereby during displacement by said rocker plates, the interior ends of the rocker plates projecting between said flat face and one end of the sleeve element and during rocking movement exerting a camming action on the sleeve element.

4. The structure of claim 1, and said bowed spring comprising a curved plate spring having a central opening through which the interior ends of the rocker plates project and side sections attached to the rotary plate element, said spring additionally comprising opposite end sections which overlie the rocker plates near their exterior ends and are attached thereto whereby the spring interconnects the pair of rocker plates and secures them to the rotary plate element.

5. The structure of claim 4, and a single pair of fastener elements serving to attach the spring end portions and said fly ball masses to the rocker plates.

6. The structure of claim 5, and the interior ends of the rocker plates being notched to accommodate said axial extension of the fly ball assembly shaft.

7. The structure of claim 3, and said primary support including a bottom wall having a central recess, a ball bearing mounted within said recess, said shaft having an enlargement below said rotary plate element and engaging the inner race of the ball bearing and serving to space the rotary plate element from said bottom wall, said primary support including an upstanding side wall surrounding said fly ball assembly below said support plate and having said support plate resting thereon.

8. The structure of claim 1, and an exterior casing for the tachometer attached to the primary support and enclosing the primary support, said fly ball assembly, said support plate, pointer and drive mechanism.

* * * * *